US010712785B2

(12) United States Patent
Lin et al.

(10) Patent No.: US 10,712,785 B2
(45) Date of Patent: Jul. 14, 2020

(54) HINGE STRUCTURE AND ELECTRONIC DEVICE

(71) Applicants: Che-Hsien Lin, Taipei (TW); Che-Hsien Chu, Taipei (TW)

(72) Inventors: Che-Hsien Lin, Taipei (TW); Che-Hsien Chu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/162,383

(22) Filed: Oct. 16, 2018

(65) Prior Publication Data
US 2019/0171256 A1 Jun. 6, 2019

Related U.S. Application Data

(60) Provisional application No. 62/573,675, filed on Oct. 17, 2017.

(51) Int. Cl.
*E05D 11/08* (2006.01)
*G06F 1/16* (2006.01)

(52) U.S. Cl.
CPC .......... *G06F 1/1681* (2013.01); *G06F 1/1616* (2013.01)

(58) Field of Classification Search
CPC ........... Y10T 16/54038; Y10T 16/5403; E05D 11/08; E05D 11/081; E05D 11/082; E05D 11/084; E05D 11/085; E05D 11/087; E05D 11/10; E05D 11/105; E05D 2011/1035; E05Y 2900/606; E05Y 2201/49; G06F 1/1681; G06F 1/1616; H04M 1/0261
See application file for complete search history.

(56) References Cited

U.S. PATENT DOCUMENTS

| | | | | |
|---|---|---|---|---|
| 6,230,365 | B1 * | 5/2001 | Lu | G06F 1/1616 16/16 |
| 6,301,748 | B1 * | 10/2001 | Su-Man | G06F 1/1616 16/337 |
| 6,748,625 | B2 * | 6/2004 | Lu | G06F 1/1616 16/285 |

(Continued)

FOREIGN PATENT DOCUMENTS

| | | |
|---|---|---|
| TW | M278932 | 10/2005 |
| TW | M482242 | 7/2014 |
| TW | I521150 | 2/2016 |

OTHER PUBLICATIONS

"Office Action of China Counterpart Application", dated Dec. 30, 2019, pp. 1-10.

*Primary Examiner* — Chuck Y Mah
(74) *Attorney, Agent, or Firm* — JCIPRNET

(57) ABSTRACT

A hinge structure including a hinge cover, a torsion element, a bracket, a fixing element and a shaft is provided. The torsion element is disposed at the hinge cover. The bracket is disposed at a side of the torsion element. The fixing element is fixed at one of the torsion element and the bracket by a fixing portion. The shaft is disposed at the hinge cover and passed through the torsion element, the bracket and the fixing element so that one of the torsion element and the bracket is adapted to rotate with the fixing element in relative to another one of the torsion element and the bracket through the shaft as an axle center. An electronic device including the aforementioned hinge structure is also provided.

16 Claims, 9 Drawing Sheets

(56) References Cited

U.S. PATENT DOCUMENTS

| | | | | |
|---|---|---|---|---|
| 6,804,859 B2 * | 10/2004 | Lu | G06F 1/1616 | 16/337 |
| 7,036,187 B2 * | 5/2006 | Rude | G06F 1/1616 | 16/342 |
| 7,089,628 B2 * | 8/2006 | Lin | G06F 1/1616 | 16/337 |
| 7,257,863 B2 * | 8/2007 | Horng | E05D 5/12 | 16/342 |
| 7,451,522 B2 * | 11/2008 | Lu | E05D 11/02 | 16/342 |
| 7,578,032 B2 * | 8/2009 | Chen | E05D 11/06 | 16/342 |
| 7,599,188 B2 * | 10/2009 | Chen | G06F 1/1616 | 361/729 |
| 8,074,322 B2 * | 12/2011 | Wang | G06F 1/1616 | 16/342 |
| 9,206,633 B1 * | 12/2015 | Ju | G06F 1/1681 | |
| 9,557,778 B2 * | 1/2017 | Sung | G06F 1/1632 | |
| 9,785,199 B2 * | 10/2017 | Kamphuis | G06F 1/1681 | |
| 2001/0016969 A1 * | 8/2001 | Fujita | G06F 1/1616 | 16/342 |
| 2003/0221288 A1 * | 12/2003 | Kim | F16M 11/10 | 16/337 |
| 2006/0048337 A1 * | 3/2006 | Lowry | E05C 17/64 | 16/342 |
| 2006/0288535 A1 * | 12/2006 | Lu | E05D 5/04 | 16/387 |
| 2008/0078058 A1 * | 4/2008 | Hsu | E05D 11/081 | 16/337 |
| 2011/0047750 A1 * | 3/2011 | Novin | F16F 1/14 | 16/297 |
| 2011/0056048 A1 * | 3/2011 | Shen | H04M 1/0216 | 16/342 |
| 2011/0072620 A1 * | 3/2011 | Wang | G06F 1/1681 | 16/342 |
| 2011/0258810 A1 * | 10/2011 | Chiang | G06F 1/1681 | 16/297 |
| 2014/0041155 A1 * | 2/2014 | Hsu | G06F 1/1681 | 16/374 |
| 2014/0331452 A1 * | 11/2014 | Zhang | G06F 1/1681 | 16/337 |
| 2015/0043155 A1 * | 2/2015 | Liang | G06F 1/1632 | 361/679.43 |

* cited by examiner

HINGE STRUCTURE AND ELECTRONIC DEVICE

CROSS-REFERENCE TO RELATED APPLICATION

This application claims the priority benefit of U.S. provisional application Ser. No. 62/573,675, filed on Oct. 17, 2017. The entirety of the above-mentioned patent application is hereby incorporated by reference herein and made a part of this specification.

FIELD OF THE INVENTION

The invention relates to a hinge structure and an electronic device.

DESCRIPTION OF RELATED ART

Most of the existing electronic devices, such as notebook computers, can realize the purpose of changing two bodies between a closed mode (the two bodies are folded into one) and an open mode (the two bodies are unfold to be separated from each other) by a hinge structure disposed between the two bodies. The hinge structure is usually assembled by a torsion element, a bracket and a shaft disposed at a hinge cover. By making the bracket fixed at one of the two bodies rotate in relative to the hinge cover and the torsion element fixed at the hinge cover through the shaft as an axle center, the body fixed with the bracket can rotate in relative to the hinge cover and another body with the shaft as the axle center so as to achieve the purpose of changing between the modes. However, the above actions are often accompanied by wobble between the torsion element and the bracket, which affects an operating stability of the electronic device.

SUMMARY OF THE INVENTION

The invention provides a hinge structure with favorable operating stability.

The invention provides an electronic device with favorable operating stability.

The hinge structure of the invention includes a hinge cover, a torsion element, a bracket, a fixing element and a shaft. The torsion element is disposed at the hinge cover and has a first through portion. The bracket is disposed at a side of the torsion element and has a second through portion. The fixing element has a third through portion and a fixing portion. The fixing element is fixed at one of the torsion element and the bracket by a fixing portion. The shaft is disposed at the hinge cover and passed through the first through portion, the second through portion and the third through portion so that the first through portion, the second through portion and the third through portion are arranged adjacent to each other and said one of the torsion element and the bracket is adapted to rotate with the fixing element in relative to another one of the torsion element and the bracket through the shaft as an axle center.

The electronic device of the invention includes two bodies and a hinge structure. The hinge structure is disposed between the two bodies so that the two bodies are adapted to rotate in relative to each other by the hinge structure. The hinge structure includes a hinge cover, a torsion element, a bracket, a fixing element and a shaft. The hinge cover is disposed between the two bodies. The torsion element is disposed at the hinge cover and has a first through portion. The bracket is disposed at a side of the torsion element, fixed at one of the two bodies and has a second through portion. The fixing element has a third through portion and a fixing portion. The fixing element is fixed at one of the torsion element and the bracket by a fixing portion. The shaft is disposed at the hinge cover and passed through the first through portion, the second through portion and the third through portion so that the first through portion, the second through portion and the third through portion are arranged adjacent to each other and said one of the torsion element and the bracket is adapted to rotate with the fixing element in relative to another one of the torsion element and the bracket through the shaft as an axle center when said one of the two bodies that is fixed with the bracket rotates in relative to the hinge cover and another one of the two bodies.

In an embodiment of the invention, said one of the torsion element and the bracket has an engaging portion. The fixing element is fixed at said one of the torsion element and the bracket by the fixing portion being engaged with the engaging portion.

In an embodiment of the invention, the first through portion is in form of a tube shape having a stripe opening and sleeved on the shaft.

In an embodiment of the invention, the second through portion is in form of a tube shape having a stripe opening and sleeved on the shaft.

In an embodiment of the invention, the fixing element includes a fixing block.

The third through portion is in form of a tube shape and sleeved on the shaft, and the fixing portion is an engaging recess.

In an embodiment of the invention, the fixing element includes a fixing plate, the third through portion is in form of a ring shape and disposed around the shaft, the fixing portion is an engaging opening.

In an embodiment of the invention, the fixing element includes a plurality of the fixing plates, and the fixing plates are disposed overlapping each other and fixed at said one of the torsion element and the bracket.

In an embodiment of the invention, the fixing element includes a plurality of the fixing plates, and the fixing plates are connected and formed as one piece and fixed at said one of the torsion element and the bracket.

In an embodiment of the invention, the fixing element has a uniform thickness in an extending direction of the shaft.

In an embodiment of the invention, the fixing element is disposed between the torsion element and the bracket.

Based on the above, the hinge structure of the invention is disposed with the fixing element, and the fixing element is further fixed at one of the torsion element and the bracket. Accordingly, in the case where the hinge structure is used for connecting the two bodies in the electronic device, when one of the two bodies disposed with the bracket rotates in relative to another one of the two bodies, one of the torsion element and the bracket is adapted to rotate with the fixing element in relative to another one with the shaft as the axle center. Therefore, wobble generated when said one of the torsion element and the bracket rotates in relative to said another one of the torsion element and the bracket may be reduced. As a result, the hinge structure and the electronic device of the invention can provide favorable operating stability.

To make the above features and advantages of the invention more comprehensible, several embodiments accompanied with drawings are described in detail as follows.

DESCRIPTION OF THE PREFERRED EMBODIMENTS

Figure 1:
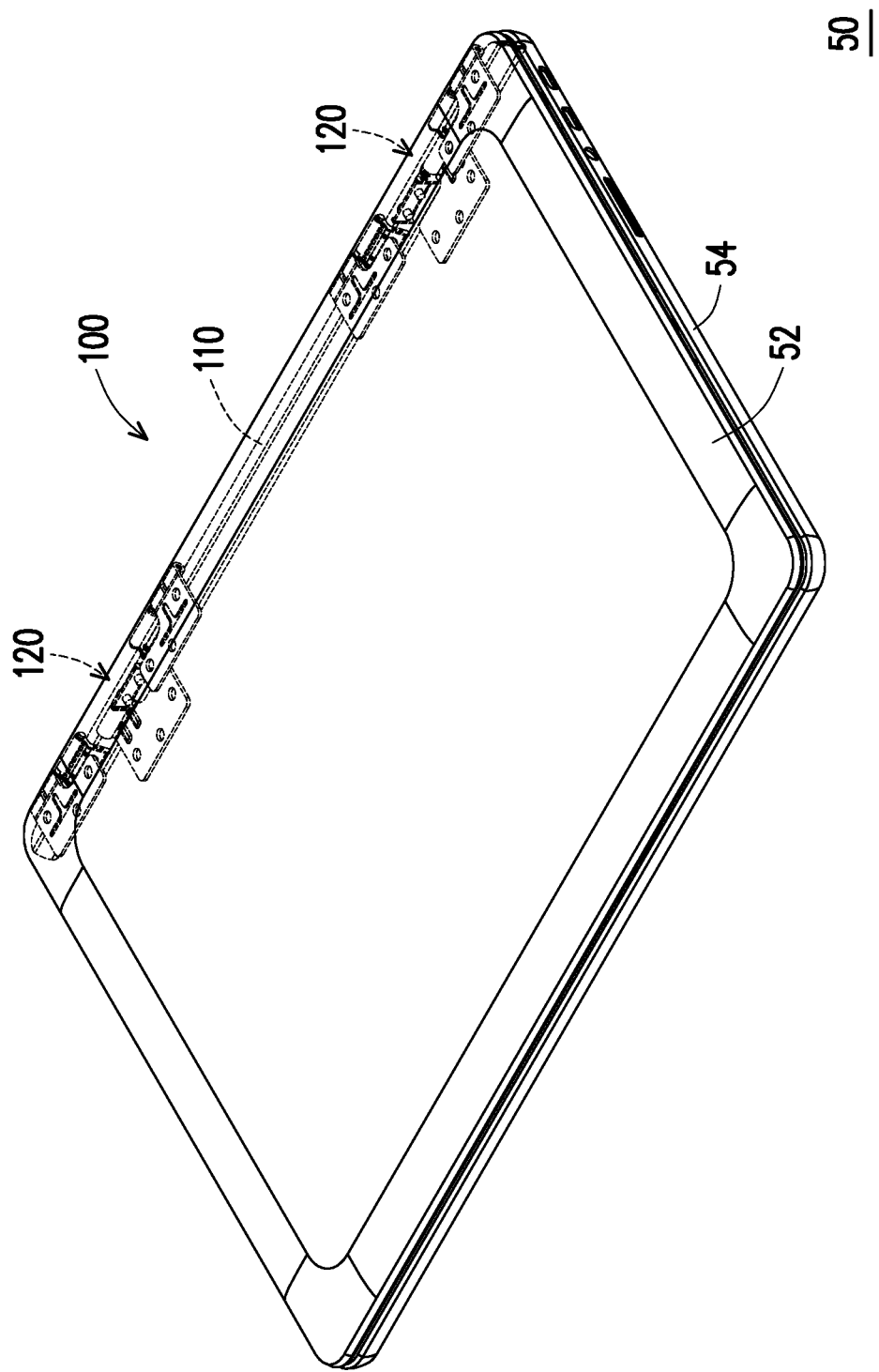
FIG. 1 is a perspective view of an electronic device according to an embodiment of the invention.
Figure 2:
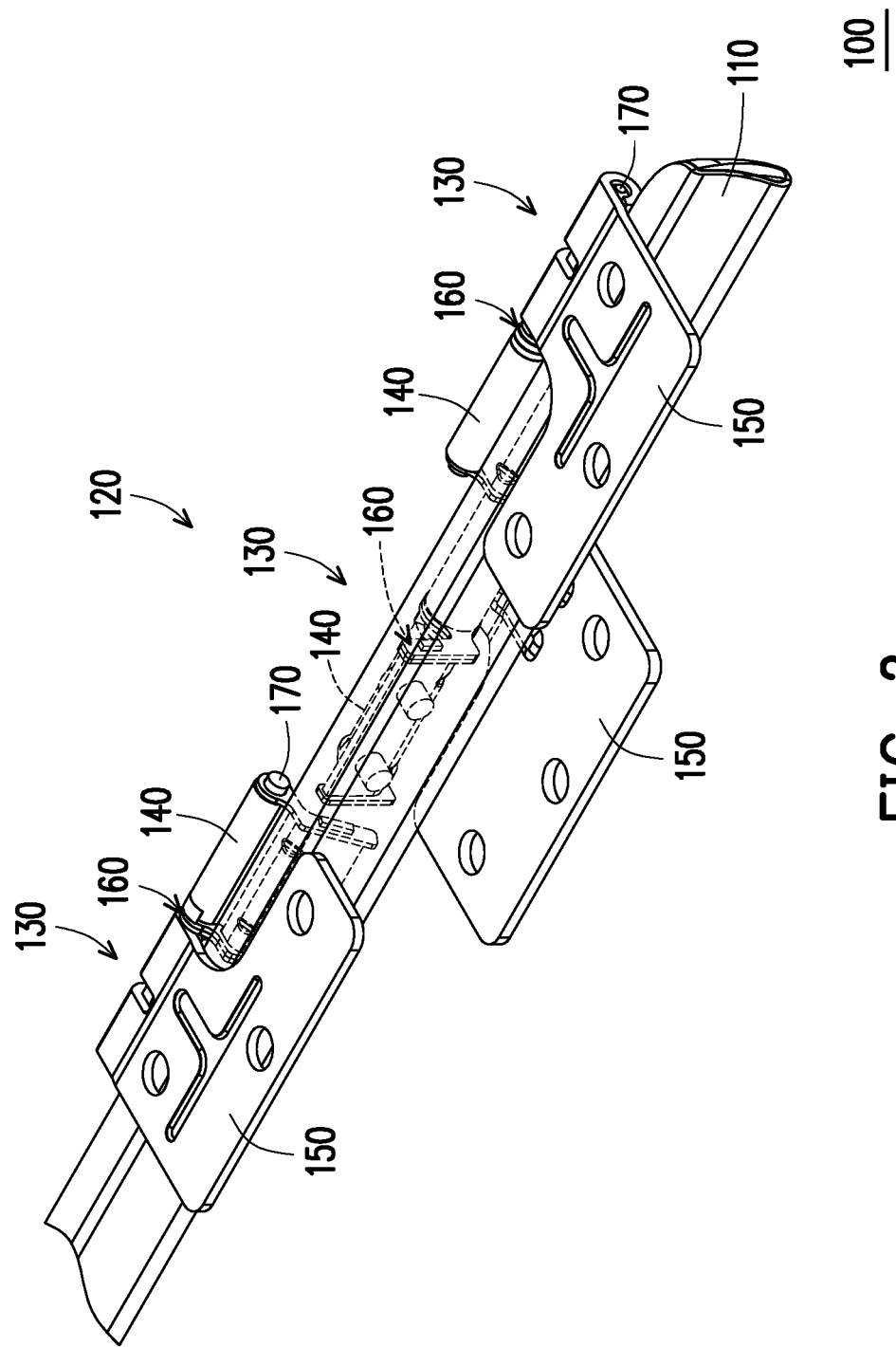
FIG. 2 is a partial perspective view of a hinge structure adopted by the electronic device of FIG. 1.

FIG. 1 is a perspective view of an electronic device according to an embodiment of the invention. FIG. 2 is a partial perspective view of a hinge structure adopted by the electronic device of FIG. 1. With reference to FIG. 1 and FIG. 2, in this embodiment, an electronic device 50 includes two bodies 52 and 54 and a hinge structure 100. The electronic device 50 is, for example, a notebook computer, in which the body 52 is an upper body having modules like a monitor, etc.; the body 54 is a lower body having modules like a keyboard, a processing unit, etc.; the hinge structure 100 (shown in dashed lines in FIG. 1) is disposed between the two bodies 52 and 54 (more preferably, hidden between the two bodies 52 and 54) so that the two bodies 52 and 54 are adapted to rotate in relative to each other by the hinge structure 100 for changing between a closed mode (the two bodies 52 and 54 are folded into one) and an open mode (the two bodies 52 and 54 are unfold to be separated from each other), but the invention is not limited thereto.

Specifically, the hinge structure 100 includes a hinge cover 110 and two hinge assemblies 120. The hinge cover 110 is disposed between the two bodies 52 and 54, and the two hinge assemblies 120 are respectively disposed at two opposite sides of the hinge cover 110 so as to connect the two bodies 52 and 54 together from the two opposite sides of the hinge cover 110. The two hinge assemblies 120 may adopt the same design, and may also adopt partially different or completely different designs. As illustrated in FIG. 2, one of the hinge assemblies 120 further includes three hinge portions 130. Two of the three hinge portions 130 (e.g., the hinge portions 130 at the left and the right sides) correspond to the body 52 (the corresponding portions are shown in dashed lines in FIG. 1), and one of the three hinge portions 130 (e.g., the hinge portion 130 at the middle) corresponds to the body 54 (the corresponding portion is shown in dashed lines in FIG. 1). The three hinge portions 130 may adopt the same design, and may also adopt partially different or completely different designs. However, the number and the implementation of the hinge assemblies 120 and the hinge portions 130 adopted by the hinge structure 100 are not particularly limited in the invention (i.e., the hinge structure 100 may have only one hinge assembly 120 or one hinge portion 130) and may be adjusted as needed.

Figure 3:
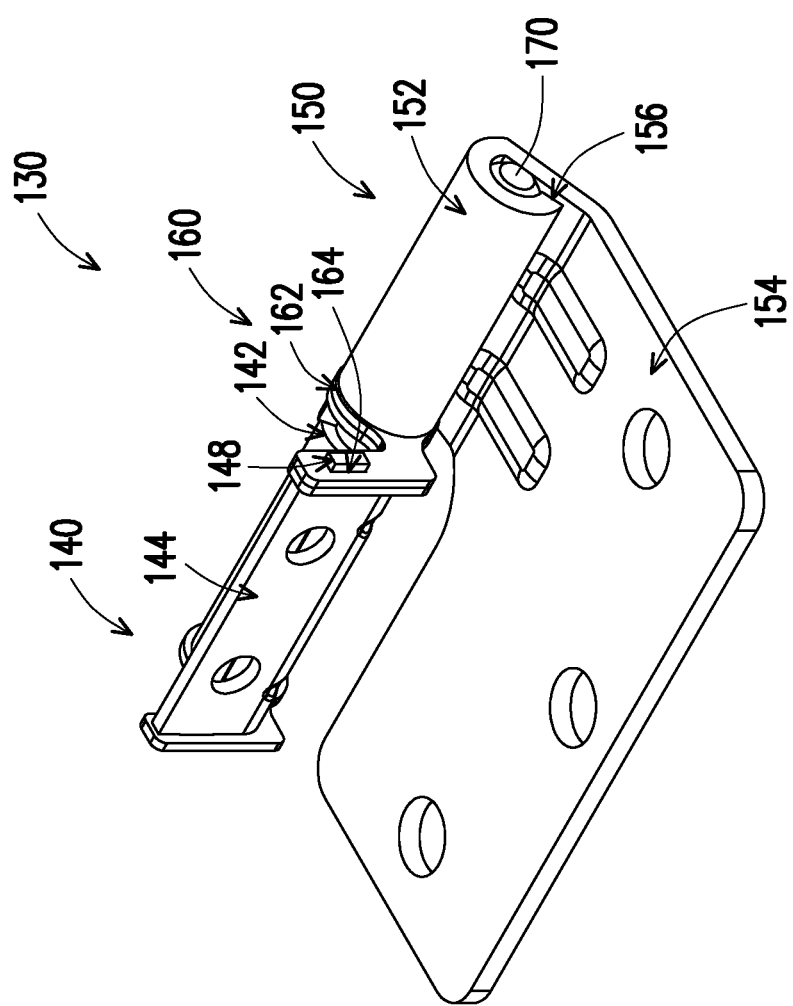
FIG. 3 is a partial perspective view of the hinge structure of FIG. 2.
Figure 4:
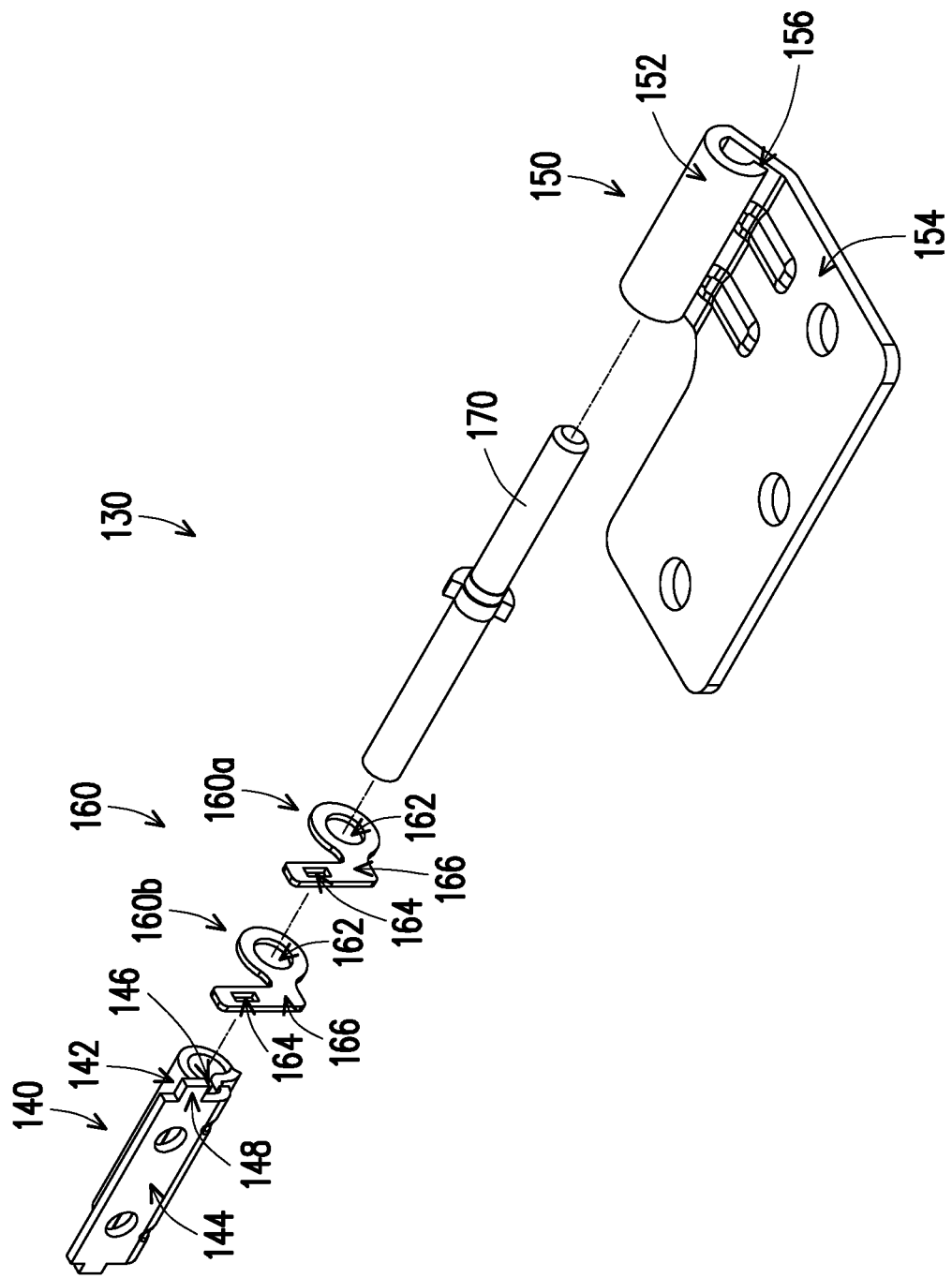
FIG. 4 is a partial exploded view of the hinge structure of FIG. 3.

FIG. 3 is a partial perspective view of the hinge structure of FIG. 2. FIG. 4 is a partial exploded view of the hinge structure of FIG. 3. Referring to FIG. 2 to FIG. 4, FIG. 3 illustrates a perspective view of the hinge portion 130 at the middle of the hinge structure 100, and FIG. 4 illustrates an exploded view of the hinge portion 130 at the middle. In this embodiment, each of the hinge portions 130 of the hinge structure 100 includes a torsion element 140, a bracket 150, a fixing element 160 and a shaft 170. The torsion element 140 is disposed at the hinge cover 110 (as shown in dashed lines in FIG. 2) and has a first through portion 142 and a connecting portion 144. The bracket 150 is disposed at a side of the torsion element 140, fixed at one of the two bodies 52 and 54 (as shown in dashed lines in FIG. 1) and has a second through portion 152 and a connecting portion 154. The fixing element 160 is disposed between the torsion element 140 and the bracket 150 and has a third through portion 162 and a fixing portion 164. The shaft 170 is disposed at the hinge cover 110 and passed through the first through portion 142, the second through portion 152 and the third through portion 162 so that the first through portion 142, the second through portion 152 and the third through portion 162 are arranged adjacent to each other.

Specifically, in this embodiment, the first through portion 142 of the torsion element 140 is in form of a tube shape having a stripe opening 146 and sleeved on the shaft 170, and the connecting portion 144 of the torsion element 140 is in form of a plate shape and fixed at the hinge cover 110 (as shown in dashed lines in FIG. 2). In this way, the torsion element 140 can rotate in relative to the shaft 170 through the first through portion 142. Similarly, the second through portion 152 of the bracket 150 is in form of a tube shape having an stripe opening 156 and sleeved on the shaft 170, and the connecting portion 154 of the bracket 150 is in form of a plate shape and fixed at one of the two bodies 52 and 54 (as shown in dashed lines in FIG. 1). In this way, the bracket 150 can rotate in relative to the shaft 170 through the second through portion 152.

Further, in this embodiment, the fixing element 160 is fixed at one of the torsion element 140 and the bracket 150 (e.g., fixed at the torsion element 140) by the fixing portion 164. More specifically, said one of the torsion element 140 and the bracket 150 (e.g., the torsion element 140) has an engaging portion 148. The engaging portion 148 is disposed at the connecting portion 144 of the torsion element 140, and the fixing element 160 is fixed at said one of the torsion element 140 and the bracket 150 (e.g., fixed at the torsion element 140) by the fixing portion 164 being engaged with the engaging portion 148. In this way, with the fixing relationship between the fixing element 164 and the torsion element 140, when the torsion element 140 rotates in relative to the shaft 170, the fixing element 160 driven by the torsion element 140 may also rotate in relative to the shaft 170 through the third through portion 162. That is to say, when said one of the two bodies 52 and 54 that is fixed with the bracket 150 rotates in relative to the hinge cover 110 and another one of the two bodies 52 and 54, said one of the torsion element 140 and the bracket 150 (e.g., the torsion element 140) is adapted to rotate with the fixing element 160 in relative to another one of the torsion element 140 and the bracket 150 (e.g., the bracket 150) through the shaft 170 as an axle center. In other words, when said one of the torsion element 140 and the bracket 150 rotates in relative to said another one of the torsion element 140 and the bracket 150 through the shaft 170 as the axle center, said one of the torsion element 140 and the bracket 150 also drives the fixing element 160 to rotate in relative to said another one of the torsion element 140 and the bracket 150 through the shaft 170 as the axle center.

More specifically, in this embodiment, the fixing element 160 includes a plurality of fixing plates 160a and 160b. The fixing plates 160a and 160b has substantially similar sizes and designs and are disposed overlapping each other. That is to say, each of the fixing plates 160a and 160b has the third through portion 162, the fixing portion 164 and an extending portion 166. The third through portion 162 corresponds to the first through portion 142, and the extending portion 166 extends outwardly from the third through portion 162 and corresponds to the connecting portion 144. Also, the fixing portion 164 is located on the extending portion 166 and corresponds to the engaging portion 148 so that aforementioned portions of the fixing plates 160a and 160b correspond to each other and overlap with each other. Accordingly, the third through portions 162 of the fixing plates 160a and 160b of the fixing element 160 are in from of a ring shape and disposed around the shaft 170, and each of the fixing portions 164 of the fixing plates 160a and 160b of the fixing element 160 is an engaging opening and fixed at the torsion element 140. Further, the fixing element 160 has a uniform thickness in an extending direction of the shaft 170 to stably abut between the torsion element 140 and the bracket 150.

Nonetheless, although the fixing element 160 of this embodiment takes the two fixing plates 160a and 160b fixed at the torsion element 140 as an example, the fixing element 160 may also be formed by one fixing plate or three fixing plates formed overlapping each other in other embodiments not shown. Alternatively, the fixing plates 160a and 160b may also be connected and formed as one piece and fixed at one of the torsion element 140 and the bracket 150 (e.g., the torsion element 140). That is to say, the fixing plates 160a and 160b may be in form a spring surrounding the shaft 170. In addition, although this embodiment takes the engaging portion 148 disposed at the connecting portion 144 of the torsion element 140 and the fixing portion 164 disposed at the extending portion 166 as an example, the engaging portion 148 may be disposed at the first through portion 142 of the torsion element 140 and the fixing portion 164 may be disposed at the third through portion 162 in other embodiments not shown so that the disposition of the extending portion 166 may be omitted in such case. Furthermore, although this embodiment takes the fixing element 160 fixed at the torsion element 140 as an example, the fixing element 160 may also be fixed at the bracket 150. That is to say, the engaging portion 148 is disposed at the bracket 150 instead to be engaged with the fixing portion 164 of the fixing element 160. The invention is not limited to aforesaid implementations. As can be seen, the number and the form of the fixing plates 160a and 160b used as the fixing member 160 are not particularly limited in the invention and may be adjusted as needed.

Figure 5:
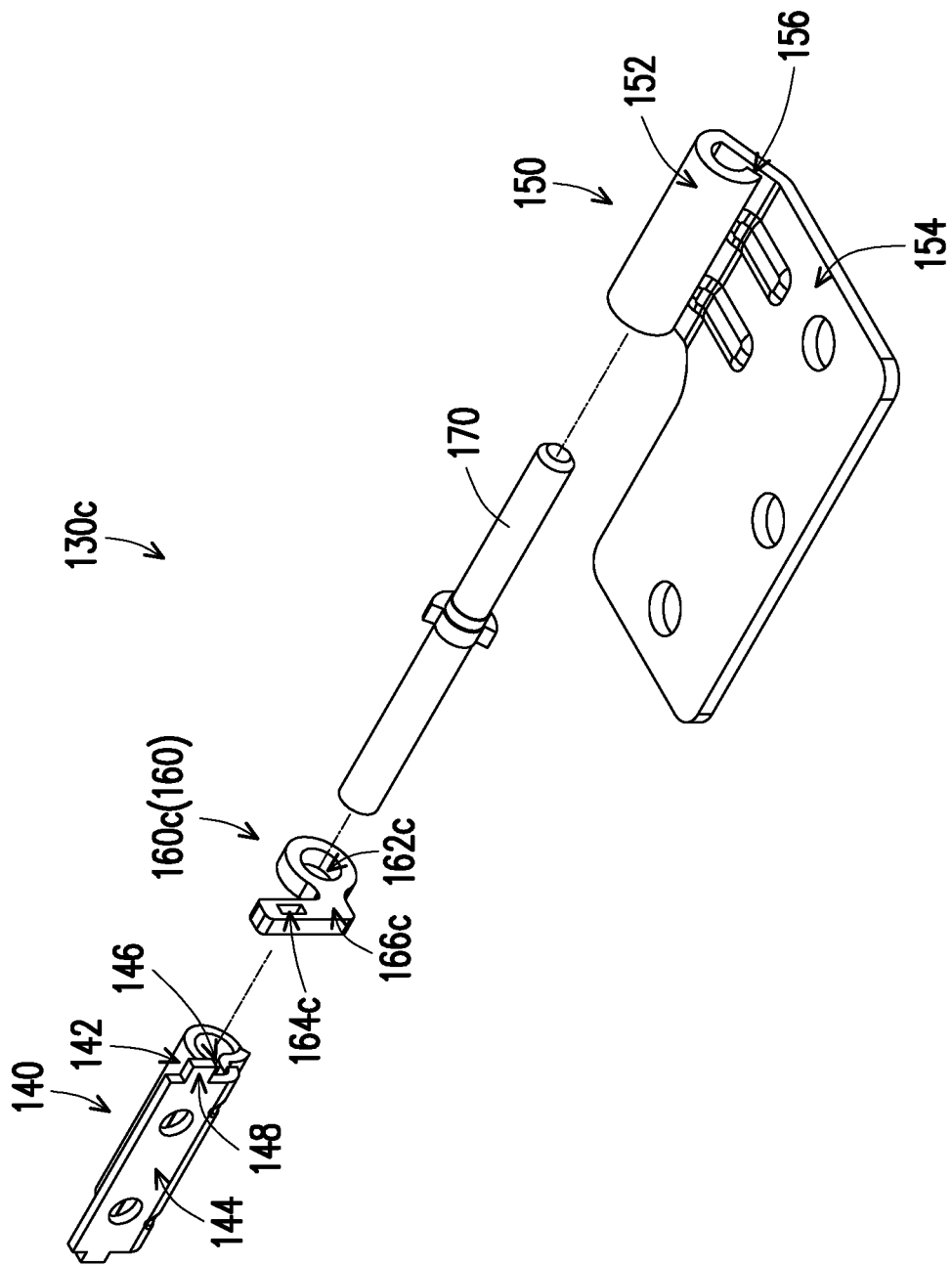
FIG. 5 is a partial exploded view of the hinge structure according to another embodiment of the invention.

FIG. 5 is a partial exploded view of the hinge structure according to another embodiment of the invention. With reference to FIG. 5, a major difference between a hinge portion 130c and the hinge portion 130 described above is that the fixing element 160 adopted by the hinge portion 130 includes the fixing plates 160a and 160b whereas the fixing element 160 adopted by the hinge portion 130c includes a fixing block 160c. More preferably, the fixing block 160c served as the fixing element 160 has a uniform thickness in an extending direction of the shaft 170 to stably abut between the torsion element 140 and the bracket 150, but not limited thereto. In this case, the fixing block 160c has a third through portion 162c, a fixing portion 164c and an extending portion 166c. Here, the third through portion 162c is in form of a tube shape, sleeved on the shaft 170 and corresponds to the first through portion 142, and the extending portion 166c extends outwardly from the third through portion 162c and corresponds to the connecting portion 144. Also, the fixing portion 164c is located on the extending portion 166c and corresponds to the engaging portion 148. In addition, the fixing portion 164c may be the engaging opening or an engaging recess. That is to say, because the fixing element 160 of this embodiment only adopts one fixing block 160c, the fixing portion 164c to be engaged with the engaging portion 148 may be a penetrated-through opening or a non-penetrated-through recess as long as the engaging portion 148 may be engaged with the fixing portion 164c. Nonetheless, in other embodiments not shown, the number of the fixed block 160c may also be plural, and the invention is not limited thereto.

As can be seen from the above description, the form of the fixing element 160 is not particularly limited in the invention so long as the fixing element 160 may abut between the torsion element 140 and the bracket 150 and may be fixed at one of the torsion element 140 and the bracket 150. However, the fixed block 160c adopted by the fixing element 160 may be manufactured by adopting a metal injection molding (MIM) process, and the fixing plates 160a and 160b adopted by the fixing element 160 may be manufactured by adopting a metal stamping treatment process. Accordingly, because the fixing plates 160a and 160b manufactured by adopting the metal stamping treatment process has a lower cost than the fixed block 160c manufactured by adopting the metal injection molding process, the fixing element 160 that adopts the fixing plates 160a and 160b can reduce overall cost for the hinge structure 100 and the electronic device 50. However, the invention is not limited to the above, and the shape, the number, the assembly and the manufacturing method of the fixing element 160 may be adjusted as needed.

Figure 6:
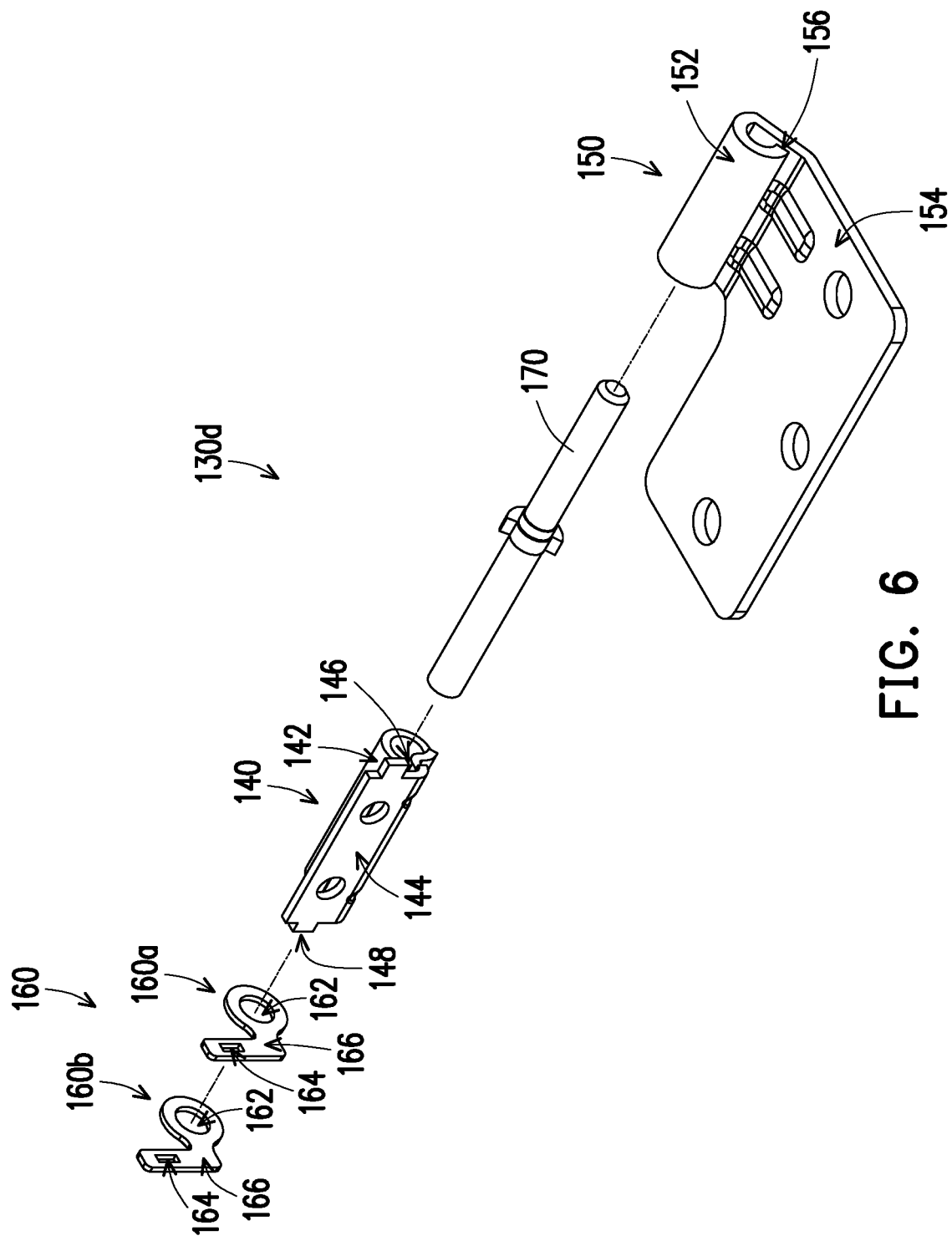
FIG. 6 is a partial exploded view of the hinge structure according to yet another embodiment of the invention.

FIG. 6 is a partial exploded view of the hinge structure according to yet another embodiment of the invention. With reference to FIG. 6, a major difference between a hinge portion 130d and the hinge portion 130 described above is that the fixing element 160 adopted by the hinge portion 130 is disposed between the torsion element 140 and the bracket 150 whereas the fixing element 160 adopted by the hinge portion 130d is disposed at another side of the torsion element 140 opposite to the bracket 150 (e.g., the left side of FIG. 6). The specific structure of the fixing element 160 includes the fixing plates 160a and 160b described above, but may also be changed to the fixing element 160c (i.e., the fixing block) used in the embodiment of FIG. 5 or other types of fixing elements (e.g., one single fixing plate or multiple fixing plates connected and formed as one piece). Here, the fixing element 160 is sleeved on the shaft 170 through the third through portion 162 and corresponds to the first through portion 142, and the extending portion 166 extends outwardly from the third through portion 162 and corresponds to the connecting portion 144. Also, the fixing portion 164 is located on the extending portion 166 and corresponds to the engaging portion 148 located another side of the connecting portion 144 to fix the fixing element 160 at the torsion element 140. Similarly, in other embodiments not shown, the fixing element 160 may also be disposed at another side of the bracket 150 opposite to the torsion element 140 (e.g., the right side of FIG. 6). In this case, the fixing element 160 is sleeved on the shaft 170 through the third through portion 162 and corresponds to the second through portion 152, and the engaging portion is disposed at the bracket 150 so that the fixing portion 164 can be fixed at the bracket 150 accordingly. As can be seen, the position of the fixing element 160 is not particularly limited in the invention. The aforementioned effects may be achieved as long as the fixing element 160 may be fixed at one of the torsion element 140 and the bracket 150 by the fixing portion 164.

In addition, according to the embodiments of FIG. 4 to FIG. 6, the torsion element 140, the bracket 150 and the fixing element 160 are arranged adjacent to each other, and the first through portion 142, the second through portion 152 and the third through portion 162 are further disposed at the shaft 170 by abutting each other. However, in other embodiments not shown, other required members like elastic pieces or gaskets may also be disposed between the torsion element 140, the bracket 150 and the fixing element 160. The required members like elastic pieces or gaskets may be sleeved on the shaft 170, and located between any two of the torsion element 140, the bracket 150 and the fixing element 160 or located outside of any one of the torsion element 140, the bracket 150 and the fixing element 160. In those cases, the torsion element 140, the bracket 150 and the fixing element 160 arranged adjacent to each other are not limited to be abutted together. As can be seen, the specific composition of the hinge portions 130, 130c and 130d of the hinge assembly 120 may be adjusted as needed, and the invention is not limited thereto.

With the above arrangement, in the case where the fixing element 160 is fixed at the torsion element 140, when the torsion element 140 rotates in relative to the shaft 170, the torsion element 140 drives the fixing element 160 to rotate together. Alternatively, in the case where the fixing element 160 is fixed at the bracket 150, when the bracket 150 rotates in relative to the shaft 170, the bracket 150 drives the fixing element 160 to rotate together. In this way, while one of the torsion element 140 and the bracket 150 rotates in relative to another one of the torsion element 140 and the bracket 150 through the shaft 170 as the axle center, one of the torsion element 140 and the bracket 150 that is fixed with the fixing element 160 further drives the fixing element 160 to rotate together. Therefore, wobble generated when the torsion element 140 and the bracket 150 are in relative rotation may be reduced. When aforementioned arrangement is adopted in the hinge structure 100 adopted by the electronic device 50, since the wobble generated when the torsion element 140 and the bracket 150 are in relative rotation may be reduced, the operation of changing the two bodies 52 and 54 between the closed mode (the two bodies 52 and 54 are folded into one) and the open mode (the two bodies 52 and 54 are unfold to be separated from each other) may become more stable.

Figure 7A:
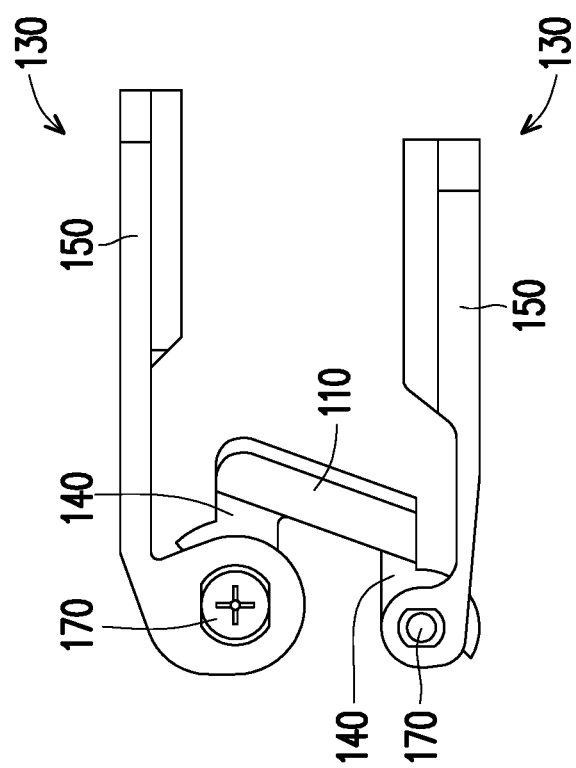
FIG. 7A to FIG. 7C are perspective side views of a hinge structure adopted by the electronic device of FIG. 1 in different operating status.
Figure 7B:
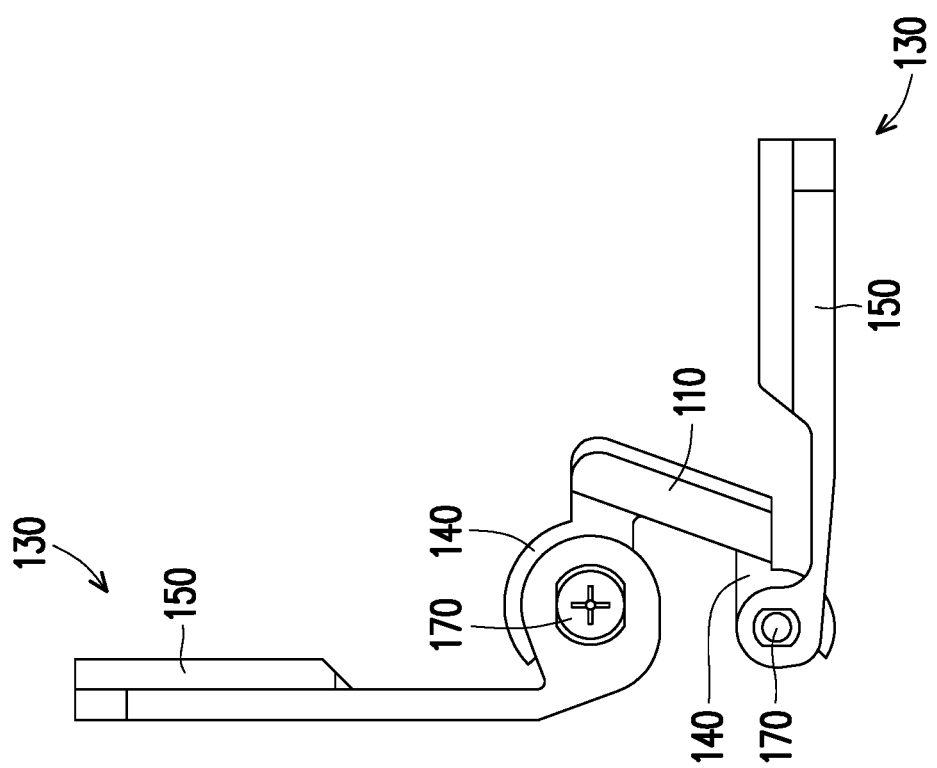
Figure 7C:
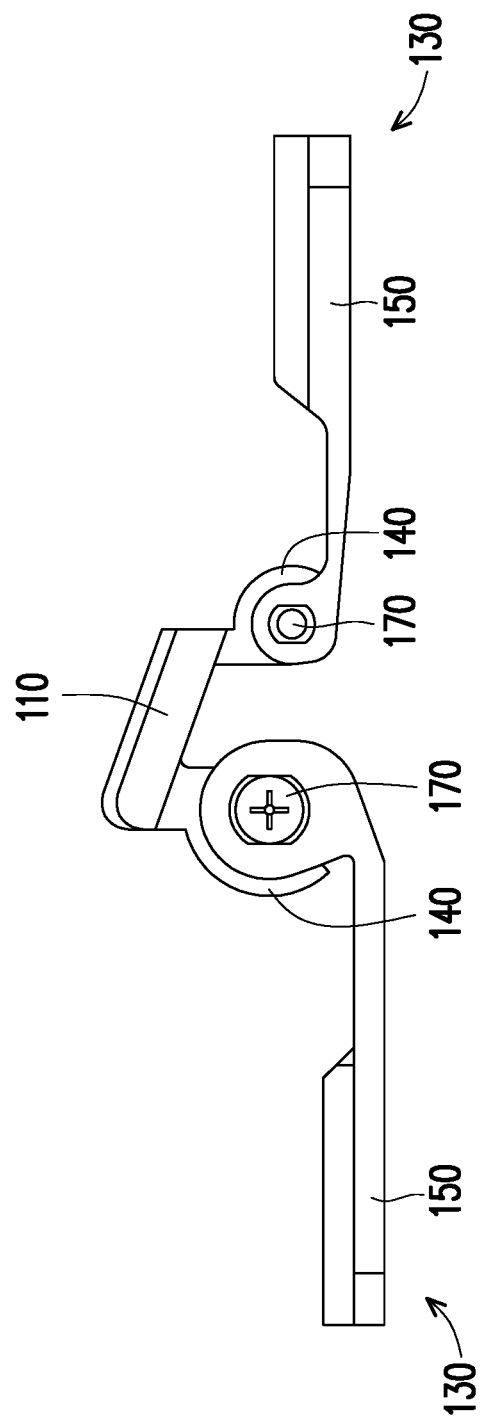

FIG. 7A to FIG. 7C are perspective side views of a hinge structure adopted by the electronic device of FIG. 1 in different operating status. With reference to FIG. 1 and FIG. 7A to FIG. 7C, since each of the hinge assemblies 120 of the embodiment further includes three hinge portions 130 in which two of the three hinge portions 130 (e.g., the hinge portions 130 at the left and the right sides in FIG. 2) correspond to the body 52 (the corresponding portions are shown in dashed lines in FIG. 1) and one of the three hinge portions 130 (e.g., the hinge portion 130 at the middle in FIG. 2) corresponds to the body 54 (the corresponding portion is shown in dashed lines in FIG. 1), an upper one of the hinge portion 130 in FIG. 7A is illustrated to represent the hinge portions 130 corresponding to the body 52 (e.g., the hinge portions 130 at the left and the right sides in FIG. 2) and a lower one of the hinge portion 130 in FIG. 7A is illustrated to represent the hinge portion 130 corresponding to the body 54 (e.g., the hinge portion 130 at the middle in FIG. 2), but the invention is not limited thereto.

In detail, the one of the upper hinge portion 130 and the lower one of the hinge portion 130 are connected with the same hinge cover 110 with their torsion element 140 respectively. When one of the two bodies 52 and 54 rotates in relative to another one of the two bodies 52 and 54, such as the body 52 rotates in relative to the body 54, the upper one of the hinge portion 130 is firstly rotated with the body 52 such that the bracket 150 of the upper one of the hinge portion 130 is rotated in relative to the hinge cover 110 and the lower one of the hinge portion 130, as shown by FIG. 7A and FIG. 7B, and until passing through a predetermined angle (such as 90 degree), the upper one of the hinge portion 130 further brings the hinge cover 110 to rotate together such that the bracket 150 of the upper one of the hinge portion 130 and the hinge cover 110 are rotated in relative to the lower one of the hinge portion 130 (which can be considered that the lower hinge portion 130 is rotated in relative to the hinge cover 110), as shown by FIG. 7B and FIG. 7C, and vice versa. As such, during one of the two bodies 52 and 54 rotates in relative to another one of the two bodies 52 and 54, only one side of the hinge portions 130 is/are rotated in relative to the hinge cover 110 while another side of the hinge portions 130 can be considered as being positioned at a fixed position with the hinge cover 110. Thereby the hinge structure and the electronic device can provide favorable operating stability.

In summary, the hinge structure of the invention is disposed with the fixing element, wherein the fixing element is further fixed at one of the torsion element and the bracket (e.g., fixed by disposing the engaging portion for engaging the fixing portion of the fixing element at one of the torsion element and the bracket), and the fixing element may be in form of one or more fixing plates or the fixing block. Accordingly, in the case where the hinge structure is used for connecting the two bodies in the electronic device, when one of the two bodies disposed with the bracket rotates in relative to another one of the two bodies, one of the torsion element and the bracket is adapted to rotate with the fixing element in relative to another one the torsion element and the bracket with the shaft as the axle center. Therefore, wobble generated when said one of the torsion element and the bracket rotates in relative to another one may be reduced. As a result, the hinge structure and the electronic device of the invention can provide favorable operating stability.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A hinge structure, comprising:
 a torsion element, having a first through portion;
 a shaft, passing through the first through portion;
 a hinge cover, covering the shaft and the torsion element;
 a bracket, disposed at a side of the torsion element and having a second through portion; and
 a fixing element, having a third through portion and a fixing portion, the fixing element being fixed at one of the torsion element and the bracket by the fixing portion,
 wherein the shaft further passes through the second through portion and the third through portion to arrange the first through portion, the second through portion and the third through portion locating adjacent to each other, and the torsion element is configured to rotate with the fixing element in relative to the bracket through the shaft as an axle center to generate torsion, or the bracket is configured to rotate with the fixing element in relative to the torsion element through the shaft as an axle center to generate torsion,
 wherein the third through portion is in form of a ring shape and disposed around the shaft, the fixing portion is an engaging opening, the fixing element comprises a plurality of the fixing plates, the fixing plates form a spring surrounding the shaft, and the fixing plates are either disposed overlapping each other and fixed at said one of the torsion element and the bracket, or the fixing plates are connected and formed as one piece and fixed at said one of the torsion element and the bracket.

2. The hinge structure according to claim 1, wherein said one of the torsion element and the bracket has an engaging portion, and the fixing element is fixed at said one of the torsion element and the bracket by the fixing portion being engaged with the engaging portion.

3. The hinge structure according to claim 1, wherein the first through portion is in form of a tube shape having a stripe opening and sleeved on the shaft.

4. The hinge structure according to claim 1, wherein the second through portion is in form of a tube shape having a stripe opening and sleeved on the shaft.

5. The hinge structure according to claim 1, wherein the fixing element comprises a fixing block, the third through portion is in form of a tube shape and sleeved on the shaft, and the fixing portion is an engaging recess.

6. The hinge structure according to claim 1, wherein the fixing element has a uniform thickness in an extending direction of the shaft.

7. The hinge structure according to claim 1, wherein the fixing element is disposed between the torsion element and the bracket.

8. The hinge structure according to claim 1, wherein the hinge cover is connected to the torsion element.

9. An electronic device, comprising:
two bodies; and
a hinge structure, disposed between the two bodies so that the two bodies are adapted to rotate in relative to each other by the hinge structure, the hinge structure comprising:
  a torsion element, having a first through portion;
  a shaft, passing through the first through portion;
  a hinge cover, covering the shaft and the torsion element;
  a bracket, disposed at a side of the torsion element, fixed at one of the two bodies and having a second through portion; and
  a fixing element, having a third through portion and a fixing portion, the fixing element being fixed at one of the torsion element and the bracket by the fixing portion,
  wherein the shaft further passes through the second through portion and the third through portion to arrange the first through portion, the second through portion and the third through portion locating adjacent to each other, and the torsion element is configured to rotate with the fixing element in relative to the bracket through the shaft as an axle center to generate torsion, or the bracket is configured to rotate with the fixing element in relative to the torsion element through the shaft as an axle center to generate torsion,
  wherein the third through portion is in form of a ring shape and disposed around the shaft, the fixing portion is an engaging opening, the fixing element comprises a plurality of the fixing plates, the fixing plates form a spring surrounding the shaft, and the fixing plates are either disposed overlapping each other and fixed at said one of the torsion element and the bracket, or the fixing plates are connected and formed as one piece and fixed at said one of the torsion element and the bracket.

10. The electronic device according to claim 9, wherein said one of the torsion element and the bracket has an engaging portion, and the fixing element is fixed at said one of the torsion element and the bracket by the fixing portion being engaged with the engaging portion.

11. The electronic device according to claim 9, wherein the first through portion is in form of a tube shape having a stripe opening and sleeved on the shaft.

12. The electronic device according to claim 9, wherein the second through portion is in form of a tube shape having a stripe opening and sleeved on the shaft.

13. The electronic device according to claim 9, wherein the fixing element comprises a fixing block, the third through portion is in form of a tube shape and sleeved on the shaft, and the fixing portion is an engaging recess.

14. The electronic device according to claim 9, wherein the fixing element has a uniform thickness in an extending direction of the shaft.

15. The electronic device according to claim 9, wherein the fixing element is disposed between the torsion element and the bracket.

16. The electronic device according to claim 9, wherein the hinge cover is connected to the torsion element.

* * * * *